(No Model.)
R. CALLENDER.
ELECTRIC CIRCUIT CONTROLLER.
No. 511,873. Patented Jan. 2, 1894.
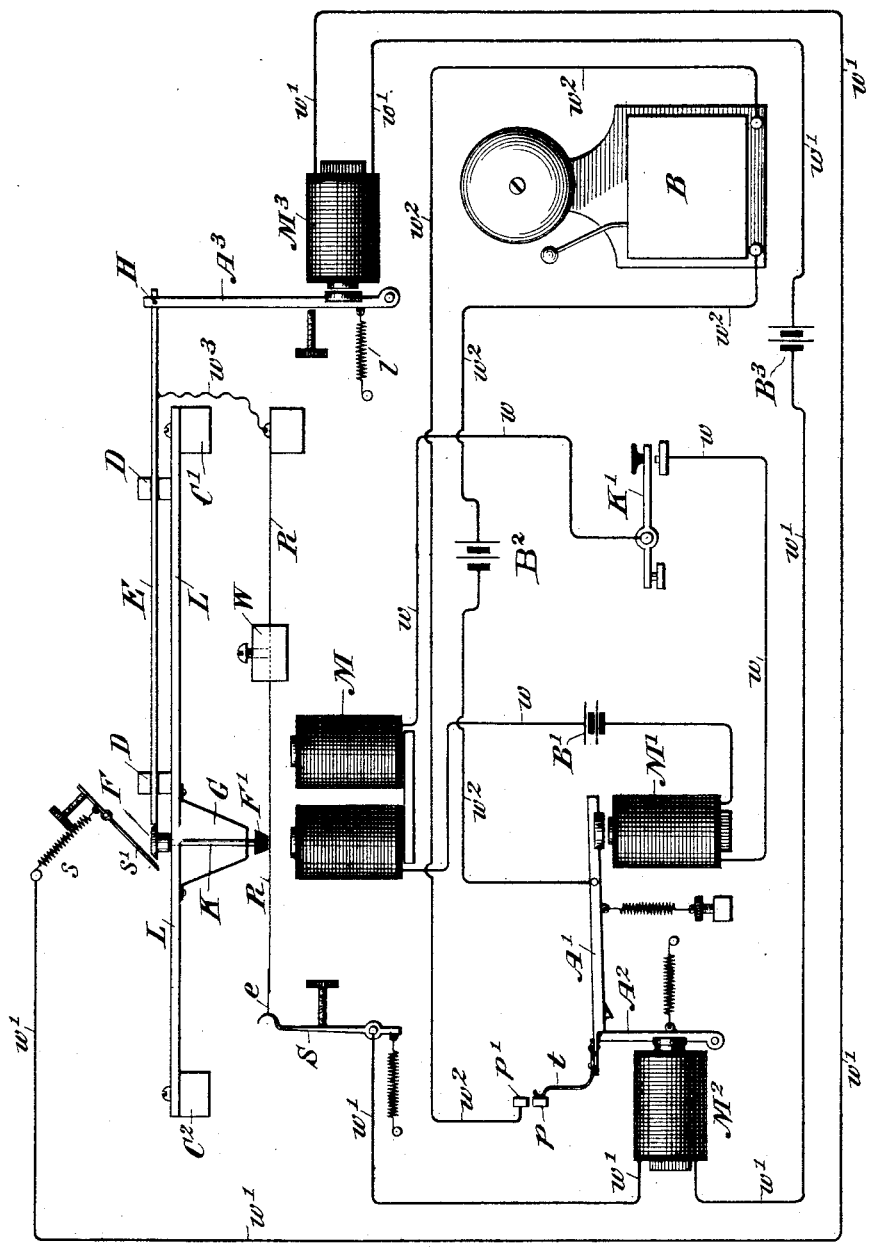
Witnesses
John P. Nordström
M. M. Robinson
Inventor
Romaine Callender
By his Attorney Charles J. Kintner

UNITED STATES PATENT OFFICE.

ROMAINE CALLENDER, OF BRANTFORD, CANADA.

ELECTRIC-CIRCUIT CONTROLLER.

SPECIFICATION forming part of Letters Patent No. 511,873, dated January 2, 1894.

Application filed April 24, 1893. Serial No. 471,559. (No model.)

*To all whom it may concern:*

Be it known that I, ROMAINE CALLENDER, a subject of the Queen of Great Britain, residing at Brantford, in the Province of Ontario, Dominion of Canada, have made a new and useful invention in Electrical-Circuit Controllers, of which the following is a specification.

My invention has for its object to provide means whereby any electrical circuit may be automatically controlled either as to the length of time it shall remain active or inactive, or as to the length of time that shall elapse between the taking of an initiatory step to open or close an electrical circuit, and the automatic completion of the act that was initiated.

To this end it consists in the novel method of and apparatus for effecting these results as will be hereinafter described and particularly pointed out in the claims at the end of this specification.

Circuit controllers as heretofore devised act to close the secondary or working circuit to and through a translating device instantaneously, or, through the medium of a step-by-step mechanism put in operation by the closure of a main or controlling circuit, the secondary or local circuit being eventually established after a predetermined time interval has elapsed. In this latter form of apparatus the time limit is approximately obtained by regulating the number of steps taken before the secondary circuit is established. Step-by-step motion has certain inherent defects which are the more noticeable in direct proportion as the rapidity of the steps is increased; and while an automatic apparatus embodying this principle will approximately measure time intervals of a certain period, it cannot measure them with exactitude, nor can it be depended upon for small accurate measurements or for a number of measurements succeeding each other and separated by only brief time intervals.

In the form of apparatus just referred to it will be found that the first closure of the main circuit is utilized to start the step-by-step motion, and that succeeding impulses immediately following have no further effect on the apparatus. While there are cases in which this action would be desirable there are also occasions where it is desirable to suspend any action of the time limit until the last one of the impulses has been transmitted, or the circuit has been closed for the last time.

My invention is designed to provide simple and efficient means for overcoming the defects referred to and also to provide a type of apparatus capable of sensitive adjustment and reliable in its action, and it will be fully understood by referring to the following specification and also to the accompanying drawing, which is a diagrammatic view illustrating the best form of such apparatus now known to me.

M is an electro magnet the coils of which are located in a main circuit $w$ $w$ which includes also a key or circuit closing device K′, a battery B′ and the coils of a relay or circuit controlling electromagnet M′.

$w^2$ $w^2$ is the local circuit which includes a local battery $B^2$, armature lever A′, spring $t$, contact $p'$ and the translating device to be controlled, in this instance a trembler bell B.

$M^3$ is a releasing electromagnet, the coils of which are located in a circuit $w'$ $w'$ including also a battery $B^3$ and the coils of a second releasing electro-magnet $M^2$. This circuit also includes adjustable circuit making and breaking devices consisting of a spiral adjusting spring $s$, a pivoted contact spring $s'$, a sliding conducting pin head F; a sliding conducting bar E; a conductor $w^3$; a vibratory reed R, a contact $e$ and an adjustable spring S. The sliding bar E is supported in slide ways or bearings D, D, which in turn are sustained by a parallel bar L carried by two cross bars C′ C².

K is a sliding pin adapted to move vertically in a guide-way G carried by the bar L and having a conducting head F at its upper end shouldered as shown, so as to be held in its upper position in contact with the spring $s'$ by the sliding bar E and in turn to lock said sliding bar in the position shown when in its lower position. This pin is provided with a non-conducting head F′ at its lower end adapted to bear against the upper surface of a vibratory steel reed or armature R fastened at one end to a support or cross bar C and provided with means of adjustment, as a weight W. The free end of this reed or armature is provided with a pointed contact $e$ adapted to make electrical contact when at rest with the free end of a yielding adjustable metallic contact S.

The outer end of the sliding bar E is pivotally connected at H to the free end of the armature lever $A^3$ of the releasing electro-magnet $M^3$.

The armature lever $A^2$ of the electro-magnet $M^2$ is a locking armature adapted to lock the armature lever $A'$ in its upper position when that lever is drawn up so that the contact spring $t$ carried at its free end will pass from the point $p$ to contact $p'$ and establish the circuit of battery $B^2$ through the translating device or bell B.

The operation of the apparatus is as follows: The weight W on the reed or armature R is first placed at such a point as will cause the reed R to vibrate a definite length of time, say five seconds for a single closure of the circuit $w, w$. The key $K'$ is then actuated so as to send a single impulse from battery $B'$ through magnet coils M, M, and the reed or armature R is set in motion. The same current impulse which energizes the magnet M M also energizes the relay magnet $M'$ and causes the armature lever $A'$ to be drawn upward so that the local circuit of battery $B^2$ is closed through conductor $w^2$ and the magnet of the trembler bell B, armature lever $A'$, spring $t$ and contact $p'$. At the same instant the locking armature lever $A^2$ falls behind the free end of armature lever $A'$ and locks it, so that when the finger is removed from the key $K'$ the local circuit remains closed through the bell. In the meantime the reed or armature R has been set in motion and so long as it continues to vibrate, the bell B will ring. On the first upward stroke of the reed R the sliding bar E was released as the conducting head F of the pin K was forced upward. Consequently the sliding locking bar E moved to the left under stress of spring $l$ and armature lever $A^3$ when the shoulder of head F passed upward and an electrical contact was established between springs $s'$, head F and sliding bar E but no circuit from battery $B^3$ is yet established as the vibratory reed continuously interrupts such circuit at the spring S and contact point $e$ as long as the reed continues to vibrate. Finally at the end of five seconds the time determined by the position of weight W, the reed settles to a stand still and circuit is established from battery $B^3$ through the following route: conductor $w'$, springs $s$ and $s'$, head F, sliding bar E, conductor $w^3$, reed R, contact $e$, spring S, conductor $w'$ releasing electro-magnet $M^3$ and conductor $w'$ thereby releasing the armature lever $A'$ and rupturing the local circuit which includes the bell or translating device and simultaneously rupturing the circuit of battery $B^3$ between the head F of pin K as the sliding bar E is drawn to the right under the influence of magnet $M^3$. It will be seen therefore that the translating device B was actuated for a predetermined length of time for a single closure of the relay of main circuit and that this term may be made of variable length by changing the position of weight W or the length of reed R, or by varying the number of vibratory impulses in any well known manner.

It is evident that where a number of vibratory impulses follow each other at regularly recurring intervals and where such impulses are separated from each other by a period of time less than the pre-determined or set time limit, the action of the secondary or local circuit will be delayed indefinitely while such impulses continue. It will also be evident that the secondary or local circuit can be brought into action by the initiatory step and that it can be caused to continue in this condition for the pre-determined time. It will also be noticed that while in this latter condition regularly recurring impulses will prolong the action during the time that these impulses continue to occur under the conditions previously named.

Such an apparatus has many important uses in the arts. It may be used as a meter for automatically recording periodicity or want of periodicity. It can likewise be used to register or notify of synchronism or non-synchronism by the obvious application of two circuit controllers jointly controlling one secondary circuit, and in the same manner it may further act as a regulator to maintain synchronism or periodicity. It may be used in connection with a signaling transmitter as a regulator or controlling switch for receiving impulses and allowing them to flow in one direction, only while they follow each other within pre-determined time intervals; a departure from periodicity or an excess of time limit between impulses resulting in the closure of the secondary circuit and the switching of succeeding impulses over another channel. In the same manner it may be used to receive impulses in series, the termination of each series allowing the secondary circuit to be brought into action for the purpose of recording a division between each series, or for switching each series over an independent path by the obvious application of a progressively moving circuit controlling switch operated by the secondary circuit. It will also be seen that an apparatus having a long period may be used in conjunction with one having a shorter period in cases where it is desirable to periodically close a circuit for a definite time and open it again for some other period of time. In this case the closure of the secondary circuit of one apparatus would be the means of starting the vibrator of the other, and vice versa; so that it will be apparent that alternations of time periods and of activity in one apparatus and inactivity in the other would follow. From the previous description it will also be understood that a third long period apparatus would readily lend itself to that condition of affairs where alternating periods of activity and inactivity were to continue over some definite period of time, counting from their initiation, and were then to be automatically held in check; the third or long period apparatus in this instance governing the number of alternations made by the other two apparati of shorter period.

The device heretofore described may also be used in any place where it is desired to prolong the action of any translating device in a secondary or independent local circuit and my claims comprehend broadly all uses where a time element and a vibrator are used for controlling an electrical circuit.

Having thus described my invention, what I claim, and desire to secure by Letters Patent of the United States, is—

1. A normally open electrical circuit including an electro-magnet having a reed armature adapted to vibrate for any pre-determined length of time on a single closure of the circuit, in combination with means whereby a second or local circuit is closed by the reed armature at the termination of its vibratory period.

2. An electrical circuit controller comprising an electro-magnet and a vibratory reed armature therefor adapted to be put into vibration for a pre-determined period of time on a single closure of a circuit through said controlling magnet, in combination with means whereby a second or local circuit is closed by the reed armature at the termination of its vibratory period: the arrangement being such that periodic circuit closures of higher frequency than the natural vibratory period of the reed armature will not effect a closure of the second or local circuit, while the first lapse of frequency exceeding the natural vibratory period of said reed armature will cause the second or local circuit to be closed.

3. A retarding circuit-closing device included in a main electrical circuit for closing a second or local circuit at any predetermined period of time after a closure of said main circuit, consisting of an electro-magnet included in the main circuit and having a vibratory reed armature therefor, together with means whereby the closure of the second or local circuit is initiated by the reed armature whenever it is thrown into vibration, but is not completely effected until the termination of the reed armature's vibratory period.

4. A circuit controlling device for regulating the length of time a circuit shall remain open, consisting of circuit interrupters at two points in the circuit, one of which is controlled by the movements of the other, in combination with mechanism and electromagnetic means for causing one of said interrupters to intermittently interrupt the circuit for a definite period of time and to place the other in closed position.

5. A circuit controlling device consisting of means for interrupting the circuit at two independent points in combination with mechanical connections between the two interrupters, the arrangement being such that the circuit is temporarily closed at one point and intermittently interrupted at the other for a definite period of time, substantially as described.

6. An electrical circuit having means for interrupting it at two independent points, in combination with means for imparting vibratory motion to one of said circuit interrupters for a definite period of time and connections between the two, whereby the circuit is established at one point and intermittently broken at the other for the stated time and finally broken at the first point again, substantially as described.

7. A retarding circuit closing device included in a main electrical circuit for closing a second or local circuit at any pre-determined period of time after a closure of said main circuit, consisting of an electromagnet included in the main circuit and having a vibratory reed armature therefor; together with means whereby the closure of the second or local circuit is initiated by the reed armature whenever it is thrown into vibration but is not completely effected until the reed armature has terminated its vibratory period, in combination with additional means for automatically rupturing the second or local circuit as soon as it has been closed.

8. A main circuit controlling a local or secondary circuit in combination with means whereby the closure of the secondary circuit is initiated through the instrumentality of a vibratory reed armature controlled by an electro magnet in the main circuit adapted to put the reed armature into motion for a definite period of time on a single closure of said main circuit, and is completed by the reed armature when it terminates its vibratory period.

In testimony whereof I have hereunto subscribed my name this 15th day of April, 1893.

ROMAINE CALLENDER.

Witnesses:
G. W. LORIMER,
J. H. LORIMER.